United States Patent
Gebhart et al.

(10) Patent No.: US 6,930,141 B2
(45) Date of Patent: Aug. 16, 2005

(54) AQUEOUS POLYMER BLEND COMPOSITION

(75) Inventors: Matthew Stewart Gebhart, New Britain, PA (US); Deborah Gay Fradkin, Horsham, PA (US); Bonnie Elizabeth Baker, Erdenheim, PA (US); John Michael Friel, Warminster, PA (US); Steven Scott Edwards, Horsham, PA (US); Caren Ann Puschak, Norristown, PA (US); Cindy Eckert, Collegeville, PA (US); Ralph Craig Even, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/410,068

(22) Filed: Apr. 9, 2003

(65) Prior Publication Data

US 2004/0010071 A1 Jan. 15, 2004

Related U.S. Application Data

(60) Provisional application No. 60/417,855, filed on Oct. 11, 2002, and provisional application No. 60/371,192, filed on Apr. 9, 2002.

(51) Int. Cl.$^7$ .......................... C08L 33/04; C08L 33/02
(52) U.S. Cl. ..................... 524/515; 524/502; 524/556; 524/560; 526/224; 526/229
(58) Field of Search ........................ 524/502, 556, 524/560, 515; 526/224, 229

(56) References Cited

U.S. PATENT DOCUMENTS

| | | | |
|---|---|---|---|
| 5,308,890 A | 5/1994 | Snyder | 523/201 |
| 5,344,675 A | 9/1994 | Snyder | 427/388.4 |
| 5,567,773 A | 10/1996 | McGee et al. | 525/221 |
| 5,731,377 A * | 3/1998 | Friel | 524/522 |
| 5,753,742 A | 5/1998 | Bumanlag | 524/501 |
| 5,990,228 A * | 11/1999 | Eichman et al. | 524/529 |
| 6,403,703 B1 | 6/2002 | Slone | 524/832 |
| 6,451,899 B1 * | 9/2002 | Zhao et al. | 524/501 |
| 6,524,656 B2 | 2/2003 | Even et al. | 427/393.5 |
| 6,545,084 B2 | 4/2003 | Brown et al. | 524/556 |
| 2003/0055171 A1 * | 3/2003 | Overbeek et al. | 525/192 |

OTHER PUBLICATIONS

Copending Application 10/162,456; filing date: Jun. 4, 2002.
Copending Application 10/162,457; filing date Jun. 4, 2002.
Copending Application 09/981,350, filing date Oct, 17, 2001.
U.S. Appl. No. 10/162,456, filed Jun. 4, 2002.
U.S. Appl. No. 10/162,457, filed Jun. 4, 2002.
U.S. Appl. No. 09/981,350, filed Oct. 17, 2001.

* cited by examiner

*Primary Examiner*—David W. Wu
*Assistant Examiner*—Satya Sastri
(74) *Attorney, Agent, or Firm*—Kim R. Jessum; Gary D. Greenblatt

(57) ABSTRACT

An aqueous polymer blend composition including a predominant amount of soft polymer particles and a minor amount of hard polymer particles is provided. The soft polymer particles contain, as copolymerized units, 70 to 99.7% by weight monoethylenically unsaturated (meth) acrylic monomer and from 0.3 to 10% by weight monoethylenically unsaturated acid monomer, based on weight of soft polymer particles. The soft polymer particles are made by a select process including redox polymerization or polymerization in the presence of excess unreacted monomer. The aqueous polymer blend composition is useful for preparing dry coatings having improved dirt pickup resistance and acceptable scrub resistance. A method is provided for preparing a dry coating from the aqueous polymer blend composition.

10 Claims, No Drawings

AQUEOUS POLYMER BLEND COMPOSITION

CROSS REFERENCE TO RELATED PATENT APPLICATIONS

This is a non-provisional application of prior pending U.S. provisional applications Ser. No. 60/417,855 filed on Oct. 11, 2002 and Ser. No. 60/371,192 filed on Apr. 9, 2002.

This invention relates to an aqueous polymer blend composition suitable for providing dry coatings having improved dirt pickup resistance and an acceptable level of scrub resistance. More particularly, this invention relates to an aqueous polymer blend composition including a minor amount of hard polymer particles and a predominant amount of soft polymer particles. The soft polymer particles contain as copolymerized units, monoethylenically unsaturated (meth)acrylic monomer and monoethylenically unsaturated acid monomer, and are prepared by select polymerization processes. The invention also relates to a method for preparing a dry coating including applying the aqueous polymer blend composition to a substrate; and drying, or allowing to dry, the aqueous polymer blend composition.

Dirt pickup resistance, a generally recognized desirable characteristic of a coating, is the ability to minimize the accumulation of material such as dirt, dust, and soot onto the surface of the coating. Coatings with poor dirt pickup resistance are characterized as having an unclean, darkened appearance. The coating must also have a desirable balance of other properties, including good scrub resistance. Further, it is desired that such a coating is optionally formed from a coating composition that contains a low level of volatile organic compounds (VOC), or preferably, is formulated in the absence of volatile organic compounds.

U.S. Pat. No. 5,731,377 is directed to a polymer blend useful as a binder in an aqueous coating composition. The disclosed polymer blend contains about 20 to about 60 weight % of a hard emulsion polymer with a glass transition temperature greater than room temperature, and about 40 to about 80 weight % of a soft emulsion polymer having a glass transition temperature of less than 15° C. The reference discloses that the polymer blend is useful in paint compositions that provide good block resistance without the use of volatile organic compounds such as a coalescent to aid in film formation. Despite this disclosure, coating compositions are desired that provide dry coatings having both acceptable scrub resistance and acceptable dirt pickup resistance.

The problem faced by the inventor is the provision of a suitable aqueous polymer composition and a method for preparing a dry coating so that a useful level of dirt pickup resistance can be effected while maintaining an acceptable level of scrub resistance. The inventors have discovered an aqueous polymer blend composition including hard polymer particles and select soft polymer particles that achieve this desired end. This aqueous polymer blend composition contains select soft polymer particles, which are predominantly acrylic emulsion polymer compositions prepared by select processes, provide useful levels of scrub resistance and suitable levels of dirt pickup resistance. The aqueous polymer blend composition is suitable for use in decorative and/or protective coatings for various substrates. Coatings prepared from this composition maintain a desirable balance of properties, particularly good scrub resistance and dirt pickup resistance.

In a first aspect of the present invention there is provided an aqueous polymer blend composition including from 2 to 30 weight % of hard polymer particles and from 70 to 98 weight % of soft polymer particles; based on the total weight of the hard polymer particles and the soft polymer particles; wherein the soft polymer particles have a glass transition temperature ($T_g$) in the range of from −20° C. to 25° C., and the hard polymer particles have a $T_g$ of greater than 25° C. and at least 10° C. greater than the $T_g$ of the soft polymer particles; wherein the soft polymer particles contain as copolymerized units, from 70 to 99.7 weight % monoethylenically unsaturated (meth)acrylic monomer, from 0.3 to 10 weight % monoethylenically unsaturated acid monomer; and from 0 to 29.7 weight % third monomer, based on weight of the soft polymer particles; and wherein: at least 40 weight % of each of the soft polymer particles, based on weight of the soft polymer particles, is formed by redox polymerization; or at least 40 weight % of each of the soft polymer particles is polymerized in the presence of at least 5 weight % of added monomer that remains unreacted, based on accumulated weight of the added monomer, the added monomer being selected from the monoethylenically unsaturated (meth)acrylic monomer, the monoethylenically unsaturated acid monomer, the third monomer, and mixtures thereof.

In the second aspect of the present invention there is provided a method for preparing a dry coating including the steps of: a) forming an aqueous coating composition containing from 2 to 30 weight % of hard polymer particles; and from 70 to 98 weight % of soft polymer particles, based on the total weight of the hard polymer particles and the soft polymer particles; wherein the soft polymer particles have a glass transition temperature ($T_g$) in the range of from −20° C. to 25° C., and the hard polymer particles have a $T_g$ of greater than 25° C. and at least 10° C. greater than the $T_g$ of the soft polymer particles; wherein the soft polymer particles contain as copolymerized units, from 70 to 99.7 weight % monoethylenically unsaturated (meth)acrylic monomer, from 0.3 to 10 weight % monoethylenically unsaturated acid monomer; and from 0 to 29.7 weight % third monomer, based on weight of the soft polymer particles; and wherein: at least 40 weight % of each of the soft polymer particles, based on weight of the soft polymer particles, is formed by redox polymerization; or at least 40 weight % of each of the soft polymer particles is polymerized in the presence of at least 5 weight % of added monomer that remains unreacted, based on accumulated weight of the added monomer, the added monomer being selected from the monoethylenically unsaturated (meth)acrylic monomer, the monoethylenically unsaturated acid monomer, the third monomer, and mixtures thereof; b) applying the coating composition to a substrate; and c) drying, or allowing to dry, the applied coating composition to prepare the dried coating.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated using the Fox equation.

As used herein, "kg" refers to kilogram and "g" refers to gram.

The aqueous polymer blend composition of this invention contains hard polymer particles and soft polymer particles dispersed in an aqueous medium. The hard polymer particles are not film forming at room temperature without the addition of coalescent or another film forming aid to lower the minimum film formation temperature of the hard polymer particles. The soft polymer particles are film forming at room temperature without the addition of coalescent or another film forming aid. Film forming refers to the ability of the polymer particles to coalesce to form a film that is materially uniform. As used herein, "room temperature" is 25° C. The aqueous polymer blend composition is characterized as an aqueous dispersion containing a predominant amount of soft polymer particles and a minor amount of hard polymer particles.

The soft polymer particles are addition polymers that contain, as copolymerized units, 70 to 99.7% by weight, based on weight of the soft polymer particles, monoethylenically unsaturated (meth)acrylic monomer including esters, amides, and nitriles of (meth)acrylic acid, such as, for example, (meth)acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (meth)acrylate, N,N-dialkyl aminoalkyl (meth)acrylate, ureidos (meth)acrylate, (meth)acrylonitrile, and (meth)acrylamide. The use of the term "(meth)" followed by another term such as acrylate, acrylonitrile, or acrylamide, as used throughout the disclosure, refers to both acrylate, acrylonitrile, or acrylamide, and methacrylate, methacrylonitrile, and methacrylamide, respectively. Monoethylenically unsaturated (meth)acrylic monomer does not include monoethylenically unsaturated acid monomer.

The soft polymer particles contain, as copolymerized units, from 0.3 to 10% by weight, based on weight of the soft polymer particles, monoethylenically unsaturated acid monomer such as, for example, carboxylic acid containing monomers and anhydride monomers such as acrylic acid, methacrylic acid, crotonic acid, itaconic acid, fumaric acid, maleic acid, monomethyl itaconate, monomethyl fumarate, monobutyl fumarate, and maleic anhydride; sulfur acid containing monomers such as sulfoethyl (meth)acrylate, 2-acrylamido-2-methylpropane sulfonic acid, vinyl sulfonic acid, styrene sulfonic acid, sulfophthalic acid, amino or diamino alkyl or aryl sulfonic acids including 1,4-butane diol-2-sulfonic acid; phosphorus acid containing monomers including phosphoalkyl (meth)acrylate such as phosphoethyl (meth)acrylate; and salts thereof. In one embodiment, the soft polymer particles contain, as copolymerized units, from 0.3 to 4% by weight (meth)acrylic acid, based on weight of the soft polymer particles. The phosphoethyl (meth)acrylate is optionally treated prior to polymerization to remove nonpolymerizable impurities such as phosphoric acid and phosphates. In another embodiment, the soft polymer particles contain a carboxylic acid containing monomer or an anhydride monomer, and from 0.01 to 3% by weight of a monoethylenically unsaturated strong acid monomer having one or more $pK_a$ values of less than 4. Suitable monoethylenically unsaturated strong acid monomers include sulfur acid containing monomers, phosphorus acid containing monomers, and salts thereof. Sodium or ammonium salts of vinyl sulfonic acid, 2-acrylamido-2-methylpropanesulfonic acid, and styrene sulphonic acid are preferred.

The soft polymer particles optionally contain, as copolymerized units, from zero to 29.7% by weight, based on weight of the soft polymer particles of third monomers which are neither monoethylenically unsaturated (meth)acrylic monomers nor monoethylenically unsaturated acid monomers. Third monomers include, for example, styrene or alkyl-substituted styrenes; butadiene; vinyl acetate, vinyl propionate, or other vinyl esters; vinyl monomers such as vinyl chloride, vinylidene chloride, and N-vinyl pyrrolidone; allyl methacrylate, vinyl toluene, vinyl benzophenone, diallyl phthalate, 1,3-butylene glycol dimethacrylate, 1,6-hexanedioldiacrylate, and divinyl benzene.

The soft polymer particles have a glass transition temperature of less than or equal to 25° C., preferably in the range of –20° C. to 25° C., and more preferably in the range of –20° C. to 20° C.

The soft polymer particles used in this invention are substantially uncrosslinked, when they are applied to a substrate in the method of this invention, although low levels of deliberate or adventitious crosslinking are optionally present. When a low level of precrosslinking or gel content is desired, low levels of optional multi-ethylenically unsaturated monomers such as, for example, 0.1% to 5% by weight, based on weight of the soft polymer particles, is optionally used. It is important, however, that the quality of the film formation is not materially impaired.

Emulsion polymerization techniques are typically employed to prepare the soft polymer particles. The practice of emulsion polymerization is discussed in detail in D. C. Blackley, *Emulsion* Polymerization (Wiley, 1975) and in H. Warson, *The Applications of Synthetic Resin Emulsions*, Chapter 2 (Ernest Benn Ltd., London 1972). Conventional surfactants are optionally used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomers.

Another optional synthesis adjuvant is a chain transfer agent, which moderates the molecular weight of the soft polymer particles. Suitable chain transfer agents include, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate. Generally, an amount of from 0.001 to 0.05, preferably 0.0025 to 0.05 moles per kg weight of the soft polymer particles, is used. Linear or branched $C_4$–$C_{22}$ alkyl mercaptans such as n-dodecyl mercaptan and t-dodecyl mercaptan are preferred. Methods to add the chain transfer agent(s) include one or more additions, which are continuous, linear, or not, over most or all of the entire reaction period or during limited portion(s) of the reaction period such as, for example, in the kettle charge and in the reduction of residual monomer stage.

The reaction temperature for emulsion polymerization is typically maintained at a temperature lower than 100° C. throughout the course of the reaction. Preferred is a reaction temperature between 30° C. and 95° C., more preferably between 50° C. and 90° C. Typically, the monomer mixture is added neat or alternatively as an emulsion in water. Methods to add the monomer mixture include one or more additions, and continuous addition; wherein the addition of the monomer is, linear or not, over the reaction period, or combinations thereof.

Suitable polymerization processes to prepare the soft polymer particles include redox polymerization and polymerization in the presence of excess unreacted monomer. Although not wanting to be bound by theory, it is believed that these polymerization processes provide reaction conditions that reduce the formation of branch points on the backbone of the soft polymer. The resulting soft polymer particles have a higher degree of linearity and improved film formation characteristics than conventional polymers that are not prepared by these select processes.

One method to prepare the soft polymer particles is a redox polymerization process. This process employs a redox initiation system that includes at least one initiator, which is commonly referred to in a redox polymerization process as an oxidant, and one or more reductants. Suitable oxidants for redox polymerization include, for example, hydrophilic initiators such as hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, ammonium or alkali metal salts of peroxydisulfuric acid; and hydrophobic initiators such as t-alkyl hydroperoxides including t-amyl hydroperoxide, t-alkyl peroxides, or t-alkyl peresters wherein the t-alkyl group includes at least 5 carbon atom. Typical oxidant levels are in the range of from 0.01% to 3.0% by weight, based on total weight of monomers. Examples of the at least one suitable reductant include, for example, sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, hydroxymethanesulfonic acid, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid, and salts of the preceding acids typically at a level of 0.01% to 3.0% by weight, based on dry polymer weight, is used. Redox reaction catalyzing metal salts of iron, copper, manganese, silver, platinum, vanadium, nickel, chromium, palladium, or cobalt are optionally used. The oxidant and optional reductant are typically added to the reaction mixture together, in separate feeds, in one or more shots, or gradually, whether uniformly or not, or in combinations thereof or variations thereon as is desired. They are typically added neat, in solution, or emulsified in an appropriate medium. Preferably, the oxidant and the optional reductant are added concurrently with the monomer mixture. The redox polymerization is preferably carried out at pH of 4 to 8.

In the redox polymerization process to prepare the soft polymer particles, at least 40% by weight, preferably at least 75% by weight, more preferably at least 95% by weight, based on the weight of the soft polymer particles, of the soft polymer particles are formed by redox polymerization. Preferably, the last 40 weight %, more preferably the last 75 weight %, and most preferably the last 95 weight % of the soft polymer particles are formed by redox polymerization. The redox polymerization is contemplated to include embodiments where some of the polymer is introduced by a polymer seed, formed in situ or not, or formed during hold periods or formed during periods wherein the monomer feed has ended and residual monomer is being converted to polymer.

In certain embodiments of the redox process to prepare the soft polymer particles, it is advantageous to choose an oxidant mixture containing one hydrophilic initiator and the hydrophobic initiator in order to increase the overall efficiency of the initiator system with regard to the initiation of the full range of hydrophilic and hydrophobic monomers. Preferably the hydrophilic initiator is less than 50% by weight of the total amount of oxidant mixture. The redox process of this embodiment optionally includes at least one suitable reductant such as those listed hereinabove.

In one embodiment, the at least 40% by weight, preferably at least 75% by weight, more preferably at least 95% by weight, based on the weight of the soft polymer particles, of the soft polymer particles are formed by redox polymerization in the presence of 0.001 to 0.05 moles chain transfer agent per kg of weight of the soft polymer particles. By "at least 40% by weight, based on weight of the soft polymer particles, of the soft polymer particles are formed by redox polymerization in the presence of 0.001 to 0.05 moles chain transfer agent per kg dry polymer weight" is meant herein that at least 40% by weight, based on weight of the soft polymer particles, of the soft polymer particles are formed by redox emulsion polymerization and that this polymerization is effected contemporaneously with the prior presence and/or addition of a total of 0.001 to 0.05 moles chain transfer agent per kg of weight of the soft polymer particles.

A second method to prepare the soft polymer particles is a polymerization process having controlled conversion of the monomer to polymer. In this controlled conversion process, the monomer is added to an aqueous reaction medium and polymerized in the presence of excess unreacted monomer to form the soft polymer particles. As used herein, "excess unreacted monomer" refers to a level of at least 5 weight % added monomer that has remained unreacted, based on the accumulated weight of added monomer. The accumulated weight of the added monomer is the total weight of monomer added to the aqueous reaction medium starting from the initial introduction of monomer into the reaction vessel. The excess unreacted monomer is equal to the accumulated weight of the added monomer minus the weight of the polymer formed from the added monomer, provided that there are no other significant pathways to remove the monomer from the aqueous reaction medium or decompose the unreacted monomer. In the description of the controlled conversion process, the use of the term "monomer" refers to the one or more monomers that are polymerized to prepare the soft polymer particles and "added monomer" refers to the monomer that has been added to the aqueous reaction medium. In the present method, at least 40 weight % of each of the soft polymer particles are prepared in the presence of excess unreacted monomer Preferably, at least 60 weight % of the soft polymer particles and more preferably at least 90 weight % of the soft polymer particles are prepared in the presence of excess unreacted monomer.

The weight % unreacted monomer in the aqueous reaction medium is determined by measuring the concentration of unreacted monomer during the polymerization process. Aliquots of the aqueous reaction mixture are removed at various intervals during the polymerization process and a sufficient amount of polymerization inhibitor is added to the aliquots to prevent subsequent polymerization of the unreacted monomer. Gas chromatography techniques with appropriate standards and detectors are employed for determining quantitatively the percentages by weight of unreacted monomer in the aliquots. The weight % reacted monomer is calculated using formula I:

weight % unreacted monomer in aliquot(i)=100×[M$_u$]$_i$/[M$_a$]$_i$ (I)

wherein: [M$_u$]$_i$ is the concentration of unreacted monomer in units of grams of monomer per gram of total materials added to the reaction vessel at the time that aliquot(i) was removed from the aqueous reaction medium, and [M$_a$]$_i$, is the concentration of the accumulated weight of monomer per gram of total materials added to the reaction vessel at the time aliquot(i) was removed from the aqueous reaction medium. The total weight of materials added to the reaction vessel includes the weights of monomer(s), water, and optional materials such as surfactants, solvents, catalysts, and initiators. The value of [M$_a$]$_i$ is calculated from the amount of monomer added to the reaction vessel and the amount of total materials added to the reaction vessel at the time aliquot(i) is removed. At least four aliquots are collected at intervals based on the weight % of total monomer used in the polymerization process to prepare the soft polymer particles. Preferably the aliquots are collected at evenly spaced intervals.

For example, using the controlled conversion polymerization process, the soft polymer particles are prepared by polymerization of 700 g ethyl acrylate, 200 g methyl methacrylate, and 100 g methacrylic acid. The total amount of monomer, 1000 g, is added to the aqueous reaction mixture over a four hour feed time. The amount of unreacted added monomer is measured after each interval of 100 g addition of monomer. The level of unreacted monomer in the polymerization is:

1,4-napthoquinone, and 2,6-dichlorobenzoquinone. Still other suitable polymerization inhibitors are n-oxyl radicals such as those disclosed, for example, in EP 135,280, DE 19,651,307, U.S. Pat. No. 5,322,912, U.S. Pat. No. 4,581,429, U.S. Pat. No. 5,412,047, and DE 19,727,502. Examples of suitable N-oxyl radicals include 2,2,6,6-tetramethylpiperidin-1-oxyl; 4-hydroxy-2,2,6,6-tetramethylpiperidin-1-oxyl; 4-hydroxy-2,6-diphenyl-2,6-dimethylpiperidin-1-oxyl; 4-carboxy-2,2,6,6-tetramethylpiperidin-1-oxyl; 4-carboxy-2,6-diphenyl-2,6-dimethylpiperidin-1-oxyl; 3-carboxy-2,2,5,5-tetramethylpyrrolidin-1-oxyl; 3-carboxy-2,5-diphenyl-2,5-dimethylpyrrolidin-1-oxyl; and sodium or potassium salts of the sulfuric acid monoester of 4-hydroxy-2,2,6,6-tetramethylpiperidin-1-oxyl. Some N-oxyl radicals are soluble in water or soluble in water with adjustment of pH; others are dissolved in the monomer used in the polymerization reaction. Typical levels of polymerization inhibitor are in the range of from 20 to 1500 ppm, preferably in the range of from 50 to 1000 ppm, more preferably in the range of from 250 to 1000 ppm, based on the weight of the added monomer.

Alternatively, an inhibitory monomer is added to the aqueous reaction medium to slow the rate of polymerization. An inhibitory monomer is a monomer that has a slow copolymerization rate with the another monomer that is used in the polymerization process. Suitable inhibitory monomers for acrylates include 1,1 diphenyl ethylene; styrenics such as styrene, alkyl styrenes, sodium vinyl sulfonate,

| Accumulated Added Monomer (g) | 100 | 200 | 300 | 400 | 500 | 600 | 700 | 800 | 900 | 1000 |
|---|---|---|---|---|---|---|---|---|---|---|
| weight % of added monomer | 10 | 20 | 30 | 40 | 50 | 60 | 70 | 80 | 90 | 100 |
| weight % unreacted monomer | 7.3 | 6.6 | 6.2 | 7.0 | 5.5 | 5.2 | 4.8 | 6.0 | 7.0 | 1.0 |

The condition of at least 5 weight % unreacted monomer occurs in the polymerization during the first 60 weight % of monomer addition and between 70 and 90 weight % of the monomer addition. In this example, at least 80 weight % of each of the soft polymer particles is prepared in the presence of excess unreacted monomer.

Examples of controlled conversion processes include redox polymerization processes and polymerization processes utilizing thermal activated initiators. Suitable thermally activated initiators include but are not limited to hydrophilic initiators listed hereinabove. Suitable initiators for controlled conversion processes having redox polymerization include but are not limited to oxidants listed hereinabove.

In the controlled conversion process, various techniques are suitable for achieving the reaction conditions having excess unreacted monomer. One technique is the addition of one or more substances with the ability to inhibit the polymerization such as a polymerization inhibitor. Examples of polymerization inhibitors are aerobic polymerization inhibitors such as hydroquinones and other phenolic materials including 2-nitrophenol, 4-nitrophenol, and 1-nitroso-2-naphthol; oxygen; and amines such as N,N-diethylhydroxylamine and p-phenylenediamine. Other suitable polymerization inhibitors are anaerobic polymerization inhibitors such as nitroso compounds including p-nitrosophenol, N-nitrosodiphenylamine, t-nitrosobutane, and t-nitrosooctane; and quinones such as as 1,4-benzoquinone, halostyrenes, alkoxystyrenes, and nitrosostyrenes; vinyl toluenes; vinyl naphthalenes; vinyl anilines; vinyl pyridines; (meth)acrylonitrile; acetoxyacrylonitrile; fumaronitrile; maleates such as dialkyl maleates including diethyl maleate, di-i-propyl maleate, and di-i-butyl maleate; and alkyl acid maleates including ethyl acid maleate, dibenzyl maleate, and diethylchloromaleate; fumarates such as dialkyl fumarates including dimethyl fumarate, diethyl fumarate, di-n-butyl fumarate, and di-2-ethylhexyl fumarate; and alkylacid fumarates including ethyl acid fumarate, butanediol fumarate, and ethyleneglycol fumarate; crotonates such as alkyl crotonates including ethyl crotonate, n-propyl crotonate, and n-butyl crotonate, crotonaldehyde, crotonamide, and crotonic acid.

Another technique to provide reaction conditions of excess unreacted monomer include polymerization in the presence of select catalytic chain transfer agents such as cobalt catalysts as disclosed in European Patent No. 822944 B1 or European Patent No. 1138730 A2.

A further technique to provide excess unreacted monomer is to limit the polymerization rate of the added monomer by employing lower levels of initiator or lower polymerization temperatures.

In one embodiment of the present invention, the soft polymer particles are prepared by a thermally initiated controlled conversion process in which the level of thermally activated initiator is adjusted so as to keep the level of unreacted added monomer in the aqueous reaction medium at a level of at least 5 weight %, based on the accumulated weight of added monomer, during the polymerization of at least 40 weight % of each of the soft polymer particles. One method to introduce the thermally activated initiator to the aqueous reaction medium is cofeeding the thermally activated initiator along with the monomer. Suitable thermally activated initiators include but are not limited to hydrophilic oxidants.

In one embodiment of the controlled conversion process, at least 40 weight %, preferably at least 80 weight %, and more preferably at least 95 weight % of each of the soft polymer particles is prepared by a one shot or multiple shot polymerization process. By a one shot polymerization process it is meant that at least 40 weight %, preferably at least 80 weight %, and more preferably at least 95 weight % of the monomers to be polymerized to form the soft polymer particles are added to the reaction vessel. After addition of this monomer charge to reaction vessel, the polymerization is initiated using either a thermally activated initiator or a redox activated initiator. Thermally activated initiators are activated by increasing the temperature of the aqueous reaction medium containing the added monomer and the thermally activated initiator. Redox activated initiators are activated by adding either the reductant or the oxidant component of the redox reaction; adding both simultaneously in separate feeds; or adding an appropriate metal ion catalyst. In the case of a multiple shot polymerization, a series of one shot polymerizations as described above are performed so as to polymerize at least 40 weight % of the monomer of the soft polymer particles under a condition of excess unreacted monomer. Typical shot polymerization processes are disclosed in Rohm and Haas publication CM-104A/cf.

In the controlled conversion process or the redox process, the level of unreacted monomer remaining after the formation of the soft polymer particles is typically reduced by various techniques known in the polymerization arts. Examples of such techniques include addition of one or more charges of initiator to polymerize the residual monomer, or removal of the unreacted monomer by distillation or steam stripping, as disclosed in U.S. Pat. No. 6,348,636.

In one embodiment, after 90–99.7%, preferably 95–99.7%, of the monomers by weight, based on the total weight of the soft polymer particles, have been converted to polymer, at least half of the remaining monomer is converted to polymer in the presence of 0.01–3.0%, by weight based on the total weight of the soft polymer particles, of t-alkyl hydroperoxide, t-alkyl peroxide, or t-alkyl perester wherein the t-alkyl group includes at least 5 carbon atoms; preferably in the presence of 0.01–1.0%, by weight based on the total weight of the soft polymer particles, of t-alkyl hydroperoxide wherein the t-alkyl group includes at least 5 carbon atoms; and more preferably in the presence of 0.01–1.0%, by weight based on the total weight of the soft polymer particles, of t-amyl hydroperoxide. This part of the reaction is typically effected as soon as 90–99.7 weight %, preferably 95–99.7 weight %, conversion of the monomers to polymer is completed in the same reaction vessel or kettle. Alternatively, it is effected after a period of time, in a different reaction vessel or kettle, or at a different temperature than the preceding part of the polymerization. Preferred is the presence of t-alkyl hydroperoxide, t-alkyl peroxide, or t-alkyl perester wherein the t-alkyl group includes at least 5 carbon atoms only after 90%, more preferably only after 95%, conversion of the monomers to polymer is completed.

In one embodiment of the present invention, the soft polymer particles are prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the soft polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the soft polymer particle will be occupied by at least one outer phase and the interior of the particle will be occupied by at least one inner phase. Each of the stages of the multi-staged emulsion polymer optionally contain the same monomers, surfactants, redox initiation system, chain transfer agents, etc. as disclosed herein above for the soft polymer particles. The soft polymer particles containing more than one polymer phase have at least 70 weight % of one or more soft polymer phases with a $T_g$ in the range of from −20° C. to 25° C., based on the weight of the soft polymer particles. In the case of a multi-staged soft polymer particle, the Tg for the purpose of this invention is calculated by the Fox equation as detailed herein using the overall composition of the soft polymer phases of the soft polymer particle without regard for the number of stages or phases therein. Similarly, compositional quantities for a multi-staged polymer particle such as, for example, the amount of monoethylenically unsaturated (meth)acrylic monomer and monoethylenically unsaturated acid monomer shall be determined from the overall composition of the soft polymer particle without regard for the number of stages or phases therein. The polymerization techniques used to prepare such multistage emulsion polymers are well known in the art such as, for example, U.S. Pat. No. 4,325,856; U.S. Pat. No. 4,654,397; and U.S. Pat. No. 4,814,373.

Typically, the soft polymer particles have a weight average molecular weight in the range of 75,000 to greater than 2,000,000, preferably in the range of 90,000 to 1,500,000, and more preferably, in the range of from 100,000 to 1,000,000.

The hard polymer particles have a glass transition temperature of greater than 25° C., preferably at least 35° C., and most preferably at least 40° C. Further, the glass transition temperature of the hard polymer particles is greater than the glass transition temperature of the soft polymer particles by at least 10° C., preferably at least 15° C., and more preferably at least 20° C. The hard polymer particles are typically addition polymers containing ethylenically unsaturated monomer as polymerized units. Examples of hard polymer particles prepared from ethylenically unsaturated monomers include, for example, acrylic (co)polymers, vinyl/acrylic copolymers, styrene/acrylic copolymers, polyvinyl chloride polymers, styrene/butadiene polymers, and mixtures thereof. These addition polymers are typically prepared by emulsion polymerization including thermal polymerization processes and redox polymerization processes. Alternatively, the polymerization process is solution polymerization followed by emulsification and optionally involves a solvent removal step. See U.S. Pat. No. 5,539,021 for detailed descriptions of a solution polymerization followed by mini-emulsion polymerization or micro-emulsion polymerizations. The hard polymer particle alternatively is a condensation polymer, including, for example, polyurethanes such as aliphatic polyurethanes and aromatic polyurethanes; polyesters; polycarbonates; polyamides; and polyureas. The hard polymer particles optionally are multi-staged polymer particles have two or more different polymer phases. The multi-staged hard polymer particles have at least 40 weight % of one or more hard polymer phases having a $T_g$ of greater than 25° C., based on the weight of the multi-staged hard polymer particle. The $T_g$ of the multi-staged hard polymer particles is determined by the Fox calculated as detailed herein using the overall composition of the one or more hard polymer phases of the multi-staged polymer particles without regard for the number of stages or phases therein. Typically, the hard polymer particles are provided as an aqueous dispersion.

Preferably, the hard polymer particles have a weight average molecular weight of at least 25,000, preferably at least 100,000, and more preferably, at least 300,000. The weight average molecular weights of the soft polymer particles and the hard polymer particles are measured by gel permeation chromatography using a polymethylmethacrylate equivalent.

The hard polymer particles and the soft polymer particles typically each have average particle diameters in the range of 20 to 1000 nanometers, preferably from 70 to 300 nanometers. Particle sizes herein are those determined using a Brookhaven Model BI-90 particle sizer manufactured by Brookhaven Instruments Corporation, Holtsville, N.Y., reported as "effective diameter". Also contemplated are multimodal particle size emulsion polymers wherein two or more distinct particle sizes or very broad distributions are provided as is taught in U.S. Pat. No. 5,340,858; U.S. Pat. No. 5,350,787; U.S. Pat. No. 5,352,720; U.S. Pat. No. 4,539,361; and U.S. Pat. No. 4,456,726.

In one embodiment, the aqueous polymer blend composition contains hard polymer particles having an average particle diameter that is larger than the average particle diameter of the soft polymer particles. Coatings prepared from this aqueous polymer blend composition have enhanced scrub resistance. Preferably the average particle diameter of the hard polymer particles is from 2 to 5 times greater than the average particle diameter of the soft polymer particles.

In another embodiment, the aqueous polymer blend composition contains soft polymer particles having an average particle diameter that is larger than the average particle diameter of the hard polymer particles. Coating prepared from this aqueous polymer blend composition have enhanced dirt pickup resistance. Preferably the average particle diameter of the soft polymer particles is from 2 to 5 times greater than the average particle diameter of the hard polymer particles.

In a further embodiment, the aqueous polymer blend composition contains both large, hard polymer particles having an average particle diameter greater than the soft polymer particles and small, hard polymer particles having an average particle diameter smaller than the soft polymer particles. Coatings formed from the aqueous polymer blend composition of this embodiment have a combination of improved dirt pickup resistance and improved scrub resistance compared to a coating containing either only hard polymer particles that are smaller or only hard polymer particles that are larger.

The aqueous polymer blend composition contains hard polymer particles in the range of from 2 to 30 weight % of the hard polymer particles, preferably from 3 to 25 weight %, and more preferably, from 5 to 21 weight %, based on the total weight of the hard polymer particles and the soft polymer particles. The level of soft polymer particles in the aqueous polymer blend composition is in the range of from 70 to 98 weight %, preferably from 75 to 97 weight %, and more preferably from 79 to 95 weight %, based on the total weight of the hard polymer particles and the soft polymer particles.

Other materials are optionally added to the aqueous polymer blend composition including rheology modifiers; coalescents; solvents; biocides; wetting agents; defoamers; dyes; humectants; waxes; surfactants; fillers or extenders; colorants; flatting agents; neutralizers; buffers; freeze-thaw additives; plasticizers; antifoaming agents; tackifiers; hindered amine light stabilizers; UV absorbers such as benzophenone, substituted benzophenones, and substituted acetophenones; dispersants; anti-oxidants; and pigments. Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilcates; silica; various clays such as kaolin and delaminated clay; and lead oxide. It is also contemplated that the aqueous polymer blend composition optionally contains opaque polymer particles, such as, for example, Ropaque™ Opaque Polymers (Rohm and Haas Co., Philadelphia, Pa.), which are useful for further improving the dry hiding of coating prepared from the aqueous polymer blend composition of this invention. It is also contemplated that extender particles with low oil absorption values are optionally added to the aqueous polymer blend composition of the invention, such as, for example, Expancel™ 551 DE20 acrylonitrile/vinyl chloride expanded particles (Expancel Inc., Duluth, Ga.); Sil-Cell™ 35/34 sodium potassium aluminum silicate particles (Silbrico Corporation, Hodgkins, Ill.); Dualite™ 27 polyvinylidene chloride copolymer coated with $CaCO_3$ (Pierce and Stevens Corporation, Buffalo, N.Y.); Fillitte™ 150 ceramic spherical particles (Trelleborg Fillite Inc., Norcross, Ga.); Microbeads™ 4A soda lime particles (Cataphote Inc.); Sphericell™ hollow glass particles (Potter Industries Inc. Valley Forge, Pa.); Eccosphere™ hollow glass spheres (New Metals & Chemicals Ltd.; Essex England ); Z-light™ Sphere W-1200 ceramic hollow spheres (3M, St. Paul, Minn.); Scotchlite™ K46 glass bubbles (3M, St. Paul, Minn.); Vistamer™ UH 1500 polyethylene particles and Vistamer™ HD 1800 polyethylene particles (Fluoro-Seal Inc, Houston, Tex.).

The amounts of pigment and extender in the aqueous polymer blend composition vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The pigment volume concentration is calculated by the following formula:

$$PVC(\%) = \frac{\text{volume of pigment(s), + volume extender(s)}}{\text{total dry volume of paint}} \times 100.$$

The typical PVC of different optional sheen levels are set out below.

| Sheen of Dry Coating | PVC (%) |
|---|---|
| stain | 4–15 |
| gloss | 15–30 |
| semi-gloss | 23–30 |
| eggshell, satin, or low luster | 30–40 |
| flat | 35–85 |

Generally, the aqueous polymer blend composition is prepared by combining an aqueous dispersion containing the soft polymer particles and an aqueous dispersion containing the hard polymer particles. Mixing is commonly employed to minimize localized concentrations of either the hard polymer particles or the soft polymer particles in the aqueous medium of the aqueous polymer blend composition. If the aqueous polymer blend composition is to be pigmented, at least one pigment is dispersed in the aqueous medium, preferably using high shear mixing. Alternatively, at least one predispersed pigment is used. In one method, the aqueous dispersion containing the soft polymer particles and the aqueous dispersion containing the hard polymer particles are added to the pigment dispersion, either simultaneously or sequentially, with mixing under low shear stirring along with other adjuvants as desired, to provide a pigmented aqueous polymer blend composition. Alternatively, the pigment slurry is prepared in the presence of the aqueous polymer blend composition containing the soft polymer particles and the hard polymers.

Preferably the aqueous polymer blend composition contains less than 5% VOC by weight based on the total weight of the aqueous polymer blend composition; more preferably the aqueous polymer blend composition contains less than 3% VOC by weight based on the total weight of the aqueous polymer blend composition; even more preferably the aqueous polymer blend composition contains less than 1.7% VOC by weight based on the total weight of the aqueous polymer blend composition. A volatile organic compound ("VOC") is defined herein as a carbon containing compound that has a boiling point below 280° C. at atmospheric pressure, compounds such as water and ammonia being excluded from VOCs.

A "low VOC" aqueous polymer blend composition herein is an aqueous polymer blend composition that contains less than 5% VOC by weight based on the total weight of the aqueous polymer blend composition; preferably it contains between 0.01% and 1.7% by weight based on the total weight of the aqueous polymer blend composition.

Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons. It is preferred that the aqueous polymer blend composition contains less than 5% by weight based on the total weight of the aqueous polymer blend composition of the added VOCs and more preferably less than 1.7% by weight based on the total weight of the aqueous polymer blend composition of the added VOCs.

Additionally, the low VOC aqueous polymer blend composition optionally contains coalescing agents that are not VOCs. A coalescing agent is a compound that is added to a water-borne emulsion polymer, paint or coating and which reduces the minimum film forming temperature (MFFT) of the emulsion polymer, paint or coating by at least 1° C. The MFFT is measured using ASTM test method D2354. Examples of coalescing agents that are not VOCs include plasticizers, low molecular weight polymers, surfactants, and autoxidizable plasticizers such as alkyl ester of unsaturated fatty acids. Preferred are alkyl esters prepared from oils such as linseed, tung, dehydrated castor, soybean, tall, sunflower, and corn. In one embodiment, the above autoxidizable plasticizer is used in combination with soft polymer particles that contain 0.25 to 12 weight % acetoacetoxyethyl (meth)acrylate as a polymerized unit. Auto oxidation is typically enhanced by the use of metal ion catalysts such as cobalt, zirconium, calcium, manganese, copper, zinc, and iron. These metal ion catalysts are commonly provided as simple salts, such as, halides, nitrates, and sulfates; or alternatively, provided as organic salts, such as, acetates, naphthenate, and acetoacetonate. That is, a non-VOC coalescing agent is a coalescing agent which has a boiling point above 280° C. at atmospheric pressure.

Typical methods of paint or coating preparation introduce adventitious VOCs from the emulsion polymer such as the aqueous dispersion containing the soft polymer particles or the aqueous dispersion containing the hard particles, biocides, defoamers, soaps, dispersants, and thickeners. These typically account for 0.1% VOC by weight based on the total weight of the aqueous polymer blend composition. Additional methods such as steam stripping and choice of low VOC containing additives like biocides, defoamers, soaps, dispersants, and thickeners are suitable for further reducing the aqueous polymer blend composition to less than 0.01% VOC by weight based on the total weight of the aqueous polymer blend composition.

In a preferred embodiment, the aqueous polymer blend composition has a PVC of less than or equal to 38 and has less than 5% VOC by weight, preferably less than 3% VOC by weight, and more preferably less than 1.7% VOC by weight, based on the total weight of the aqueous polymer blend composition. In another preferred embodiment, the aqueous polymer blend composition has a PVC of greater than 35 and has less than 3% VOC by weight and preferably less than 1.7% by weight, based on the total weight of the aqueous polymer blend composition. In an additional embodiment the aqueous polymer blend composition has a PVC of less than or equal to 85 and has less than 1.7% VOC by weight, preferably less than 0.5% by weight, and more preferably less than 0.1% by weight, based on the total weight of the aqueous polymer blend composition.

The solids content of the aqueous polymer blend composition is typically in the range of from 25% to 60% by volume. The viscosity of the aqueous polymer blend composition is typically from 50 KU (Krebs Units) to 120 KU as measured using a Brookfield Digital viscometer KU-1; the viscosities appropriate for different application methods vary considerably.

The aqueous polymer blend composition is suitable for application onto a substrate to prepare a dry coating. Various techniques are employed to apply the aqueous polymer blend composition onto a substrate including, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the applied aqueous polymer blend composition may be in the range of 1 micron to 250 microns. The aqueous polymer blend composition is applied onto a substrate as a single coat or multiple coats. After application, the applied aqueous polymer blend composition is typically allowed to dry at ambient conditions or alternatively dried by the application of heat to provide a dry coating. Drying is typically allowed to proceed under ambient conditions such as, for example, at 0° C. to 35° C.

The aqueous polymer blend composition is suitable for application onto various substrates including processed timber such as medium density fiber board, chip board, laminates; mineral substrates such as masonry, cement, fiber cement, cement asbestos, plaster, plasterboard, glazed and unglazed ceramic; metal substrates such as galvanized iron, galvanized steel, cold rolled steel, Zincalum metal, Zincalum II metal, aluminum, wrought iron, drop forged steel, stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, epoxy coatings; cellulosic substrates such as paper and paperboard; glass; asphalt; leather; wallboard; nonwoven materials; and synthetic substrates such as polyvinyl chloride, polyvinylidene chloride, polyethylene, and polypropylene.

The dry coating prepared from the aqueous polymer blend composition is suitable as a protective coating or an aesthetic coating. Examples of suitable coatings include architectural coatings such as interior and exterior paint coatings, including masonry coatings, wood coating and treatments; floor polishes; maintenance coatings such as metal coatings; paper coatings; and traffic coatings such as those coatings used to provide markings on roads, pavements, and runways.

In one embodiment of the present invention, a method for improving the adhesion of a dry coating is provided including the steps of: a) forming an aqueous polymer blend composition including from 2 to 30 weight % of hard polymer particles having a $T_g$ of greater than 25° C. and from 70 to 98 weight % of soft polymer particles having a $T_g$ in the range of −20° C. to 25° C., based on the total weight of the hard polymer particles and the soft polymer particles; wherein the $T_g$ of the hard polymer particles is at least 10° C. greater than the $T_g$ of the soft polymer particles; wherein the soft polymer particles contain, as copolymerized units, based on weight of the soft polymer particles, 70 to 99.6% by weight monoethylenically unsaturated (meth) acrylic monomer, 0.1 to 12.5% by weight aldehyde reactive group-containing monomer, from 0.3 to 10% by weight monoethylenically unsaturated acid monomer, and optionally, third monomer; and wherein at least 40% by weight, based on weight of the soft polymer particles, of the soft polymer particles are formed by redox polymerization, or at least 40 weight % of each of the soft polymer particles is polymerized in the presence of at least 5 weight % of added monomer that remains unreacted, based on accumulated weight of the added monomer, the added monomer being selected from the monoethylenically unsaturated (meth)acrylic monomer, the aldehyde reactive group-containing monomer, the monoethylenically unsaturated acid monomer, and the third monomer; b) applying the aqueous polymer blend composition to a substrate; and c) drying, or allowing to dry, the applied aqueous polymer blend composition. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically unsaturated aldehyde reactive group-containing monomers are, for example, vinyl acetoacetate, acetoacetoxyethyl (meth) acrylate, acetoacetoxypropyl (meth)acrylate, allyl acetoacetate, acetoacetoxybutyl (meth)acrylate, 2,3-di (acetoacetoxy)propyl (meth)acrylate, vinyl acetoacetamide, acetoacetoxyethyl (meth)acrylamide, 3-(2-vinyloxyethylamino)-propionamide, N-(2-(meth) acryloxyethyl)-morpholinone-2, 2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth) acryloxyethyldimethyl-β-propiobetaine, diethanolamine monovinyl ether, o-aniline vinyl thioether, (meth) acryloxyacetamido-ethylethyleneurea, ethyleneureidoethyl (meth)acrylate, (meth)acrylamidoethyl-ethyleneurea, (meth) acrylamidoethyl-ethylenethiourea, N-((meth) acrylamidoethyl)-N-(1-hydroxymethyl)ethyleneurea, N-((meth)acrylamidoethyl)-N-(1-methoxy) methylethyleneurea, N-formamidoethyl-N-(1-vinyl) ethyleneurea, N-vinyl-N-(1-aminoethyl)-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth) acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing aziridine functionality. Preferred is 0.25% to 5%, by weight based on total monomer weight, of a copolymerized ethylenically-unsaturated aldehyde reactive group-containing monomer, based on the weight of the soft polymer particles. In one embodiment, the redox polymerization of the soft polymer particles is conducted in the presence of 0.001 to 0.05 moles chain transfer agent per kg weight of the soft polymer particles. In a second embodiment, from 0.25 to 12.5 weight % of the copolymerized acetoacetoxyethyl (meth)acrylate is used as the aldehyde reactive group-containing monomer. In a further embodiment, adhesion of a dry coating is enhanced employing an aqueous polymer blend composition having both the soft polymer particles and the hard polymer particles contain aldehyde reactive group-containing monomer as copolymerized units. Suitable levels of aldehyde reactive group-containing monomer contained as copolymerized units in the soft polymer particles and the hard polymer particles are in the range of 0.1 to 12.5% by weight, based on the weight of the respective polymer particles.

In an alternative embodiment, the soft polymer particles contain a sufficient amount of copolymerized monomer(s) having select reactive functionality that is not reactive with aldehydes. During or after polymerization, the select reactive group is reacted to form aldehyde reactive groups. The soft polymer particles may be prepared with 0.1–12.5% by weight copolymerized aldehyde-reactive monomer equivalent, based on the total weight of the soft polymer particles. By "copolymerized aldehyde-reactive monomer equivalent" is meant herein the copolymerized monomer which leads to the soft polymer particles having aldehyde reactive groups even though the soft polymer particles were formed by a post-polymerization reaction rather than directly formed by the copolymerization of ethylenically-unsaturated aldehyde reactive group-containing monomer. In this embodiment, for example, the reaction product of polymers containing carboxylic acid functionality with compounds consisting of or containing an aziridine (ethyleneimine) ring or rings may be formed. Substitution on the ring may be on the nitrogen and/or either or both carbons such as, for example, ethyleneimine, propyleneimine, N-(2-hydroxyethyl) ethyleneimine, trimethylolpropane-tris-(β-(N-aziridinyl) propionate), and pentaerythritol trimethylolpropane-tris-(β-(N-aziridinyl) propionate). Also, polymers containing β-aminoester and/or β-hydroxyamide functionality may be formed by post-polymerization processes.

In another embodiment, the aforementioned hard polymer particles contain as polymerized units from 0 to 12.5 weight % of aldehyde reactive group-containing monomer, based on the weight of the hard polymer particles.

The following examples are presented to illustrate the invention and the results obtained by the test procedures.

Test Procedures

Scrub Resistance:

An aqueous polymer blend composition and a comparative composition, each composition containing 22% by volume titanium dioxide, having 36% nonvolatile material based on the total volume of the composition, and having less than 1.5 weight % VOC, are drawn down on a single black vinyl chart. Both compositions contain the same VOC level. The compositions are drawn in such a way that the two compositions are placed side by side and drawn together by a single drawing with a 0.0762 mm (3 mil) Bird film applicator 152.4 mm (6 inch) in width. Each composition forms a 7.5 cm (3 inch) wide coating on a single chart, and the two compositions have the same coating thickness. The sample is allowed to dry at 23° C. (73° F.) and 50% relative humidity for 7 days. Abrasive scrub resistance is measured with a scrub machine (Gardner Abrasive Tester) using 10 g scrub medium and 5 ml water. A piece of 0.0254 mm (1-mil) thick and 76.2 mm (3 inch) wide vinyl shim is placed underneath the sample vinyl chart. The two side edges of the shim are in the center of each coating. The number of cycles required to completely cut through each coating is recorded.

The relative scrub resistance is determined by comparing the aqueous polymer blend composition containing the hard polymer particles and the select soft polymer particles with a comparative aqueous polymer blend composition containing the hard polymer particles and comparative soft polymer particles. The comparative soft polymer particles have substantially the same composition as the select soft polymer particles but are not prepared by a polymerization process wherein at least 40 weight % of the soft polymer particles are formed by a redox polymerization. Comparative soft polymer particles having substantially the same composition as the select soft polymer particles refers to polymer particles wherein the amount of each the monomer incorporated into the polymer particles is within 5 weight % of the amount of that monomer in the select soft polymer particles. The select soft polymer particles are prepared by a polymerization process wherein at least 40 weight % of the soft polymer particles are formed by a redox polymerization. The aqueous polymer blend composition and the comparative aqueous polymer blend composition have the same weight ratio for the hard polymer particles and the soft polymer particles. The other components of the aqueous polymer blend composition and the comparative aqueous polymer blend composition, as well as their levels of addition, are identical in the two compositions. The relative scrub resistance is the ratio of the number of scrub cycles for the aqueous polymer blend composition versus the number of scrub cycles for the comparative aqueous polymer blend composition. A relative scrub resistance value, referred to as "RS", having a value of 1.1 or above is considered acceptable.

Dirt Pickup Resistance:

An aqueous polymer blend composition and a comparative composition, each composition containing 22% by volume titanium dioxide, having 36% nonvolatile material based on the total volume of the composition, and having less than 2.5 weight % VOC, are drawn down on separate aluminum panels at a wet thickness of 0.0762 mm (3 mil) using a Bird film applicator 76.2 mm (3 inch) in width. Both compositions contain the same VOC level. The samples are allowed to dry at 21° C. (70° F.) and 50% relative humidity for 7 days. The samples are exposed in southern Florida at a commercial exposure station (Q-LAB Weathering Research Service, Homestead, Fla.). The exposure direction is south at a 45° angle. The colors of the dry coating samples are characterized by measuring initial values of L*, a*, and b* prior to exposure. After 90 days of exposure, the L*, a*, and b* values are remeasured to determine the changes in color of the dry coating samples. The changes in the values of L*, referred to as "ΔL*", are determined for the dry coating samples. A negative value for ΔL* indicates a darkening of the dry coating as a result of the pickup of dirt and other material on the dry coating surface.

The relative dirt pickup resistance is determined by comparing the aqueous polymer blend composition containing the hard polymer particles and the select soft polymer particles with a comparative aqueous polymer composition containing the select soft polymer particles. The select soft polymer particles are prepared by a polymerization process wherein at least 40 weight % of the soft polymer particles are formed by a redox polymerization. The weight % select soft polymer particles in the comparative aqueous polymer composition is equal to the total weight % of the select soft polymer particles and the hard polymer particles in the aqueous polymer blend composition. The other components of the aqueous polymer blend composition and the comparative aqueous polymer composition, as well as their levels of addition, are identical in the two compositions. The relative dirt pickup resistance is the ratio of the ΔL* value for the dry coating prepared from the comparative aqueous polymer composition divided by the ΔL* value for the dry coating prepared from the aqueous polymer blend composition. A relative dirt pickup resistance value, referred to as "RL", having a value of 1.1 or greater indicates improvement in the dirt pickup resistance.

Total Improvement Factor

A factor characterizing both the dirt pickup resistance property and the scrub resistance property of a dry coating is calculated by multiplying the relative scrub resistance value by the relative dirt pickup resistance value. This factor is referred to as the total performance improvement factor or "TIF". A TIF value of 1.1 or greater is considered to be an improvement.

The abbreviations listed below are used throughout the examples.

| | |
|---|---|
| MAA = | methacrylic acid |
| BA = | butyl acrylate |
| MMA = | methyl methacrylate |
| n-DDM = | n-dodecyl mercaptan |
| SLS = | sodium lauryl sulfate (28% active) |
| APS = | ammonium persulfate |
| DI water = | deionized water |
| g = | Gram |

EXAMPLE 1

Preparation of an Aqueous Dispersion Containing Soft Polymer Particles

An aqueous dispersion containing the soft polymer particles was prepared by redox polymerization.

A monomer emulsion was prepared by combining 600 g BA, 20 g MAA, 365 g MMA, 1.25 g nDDM, 400 g DI water, 6.9 g sodium carbonate and 30.5 g SLS and emulsifying with stirring. Next, 5.2 g SLS and 380 g DI water were charged to a three liter multi-neck flask fitted with mechanical stirring. The flask contents were heated to 65° C. under a nitrogen atmosphere. To the stirred flask contents were added 35 g of the monomer emulsion followed by 0.02 g ferrous sulfate heptahydrate and 0.02 g tetrasodium salt of ethylenediamine-tetraacetic acid in 15.6 g DI water. Polymerization was initiated by the addition of 0.54 g APS in 8 g DI water followed by 0.27 g sodium hydrosulfite in 8 g DI water. Next, 30 g of a 50% solution of ureido methacrylate was added to the remainder of the monomer emulsion and gradual addition of the monomer emulsion was subsequently initiated. Separate solutions of 2.9 g APS in 50 g DI water and 1 g of D-isoascorbic acid in 50 g DI water were fed concurrently with the monomer emulsion. Total addition time for the three feeds was 90–100 minutes. The contents of the flask was maintained at 65° C. throughout the addition of the monomer emulsion. The emulsion feed line was rinsed with 20 g DI water. After completion of the monomer emulsion addition, the reactor was cooled to 60° C. Next, an aqueous solution containing 10 ppm ferrous sulfate, 1 g t-butyl hydroperoxide and 0.5 g D-isoascorbic acid was added. The contents of the flask was neutralized to a pH in the range of 9–10 with ammonium hydroxide.

The % conversion of the monomer in the reaction mixture during the addition of the monomer emulsion is shown in Table 1.2.

TABLE 1.2

% Conversion of Monomer in the Polymerization of Example 1

| weight % of monomer feed | weight % polymer formed | weight % unreacted added monomer |
| --- | --- | --- |
| 20 | 86.2 | 13.8 |
| 40 | 88.3 | 11.7 |
| 60 | 89.5 | 10.5 |
| 80 | 90.8 | 9.2 |
| 90 | 92.5 | 7.5 |
| 100 | 90.6 | 9.4 |

The resulting aqueous dispersion, Example 1, contained 49.2 weight % soft polymer particles, based on the total weight of Example 1. The soft polymer particles had an average particle diameter of 187 nm and a glass transition temperature of −10° C.

Example 1 was prepared by a polymerization process wherein at least 40% of the weight of the soft polymer particles were prepared by a redox polymerization. Further, the soft polymer particles of Example 1 were formed in a process wherein at least 40 weight % of each of the soft polymer particles were polymerization in the presence of excess unreacted monomer.

EXAMPLE 2

Preparation of an Aqueous Dispersion Containing Soft Polymer Particles

An aqueous dispersion containing the soft polymer particles is prepared by a thermally initiated controlled conversion process.

A monomer emulsion is prepared by combining 480 g MMA, 500 g BA, 20 g MAA, 1.25 g nDDM, 455 g DI water, and 30.5 g SLS and emulsifying with stirring. Next, 5.2 g SLS and 215 g DI water are charged to a three liter multi-neck flask fitted with mechanical stirring. The contents of the flask is heated to 88° C. under a nitrogen atmosphere. To the stirred flask contents, 35 g of the monomer emulsion is added followed by a solution containing 0.35 g sodium carbonate and 0.3 g APS in 20 g DI water. Next, the monomer emulsion is gradually added to the flask along with the concurrent addition of an initiator solution containing 1.05 g APS and 6.55 g sodium carbonate in 50 g DI water. The total addition time for the feeds is approximately 90–100 minutes. Throughout the addition of the monomer emulsion, the contents of the flask is maintained at a temperature of 88° C. After the complete addition of the monomer emulsion and the initiator solution, the emulsion feed line is rinsed with 20 g DI water, which is added to the flask. Next, the contents of the flask is cooled to approximately 60° C. and an aqueous solution containing 10 ppm ferrous sulfate, 1 g t-butyl hydroperoxide and 0.5 g D-isoascorbic acid is added. The contents of the flask is neutralized to a pH in the range of 9–10 with ammonium hydroxide.

The % conversion of the monomer in the reaction mixture during the addition of the monomer emulsion is shown in Table 2.2.

TABLE 2.2

% Conversion of Monomer in the Polymerization of Example 2

| weight % of monomer feed | weight % polymer formed | weight % unreacted added monomer |
| --- | --- | --- |
| 20 | 88 | 12 |
| 40 | 87 | 13 |
| 60 | 89 | 11 |
| 80 | 91 | 9 |
| 90 | 92 | 8 |
| 100 | 93 | 7 |

The resulting aqueous dispersion, Example 2, contains 50.2% by weight of the soft polymer particles, based on the total weight of Example 2. The soft polymer particles have an average particle diameter of 169 nm and a glass transition temperature of 5° C.

COMPARATIVE A

Preparation of an Aqueous Dispersion Containing Comparative Soft Polymer Particles An aqueous dispersion containing comparative soft polymer particles was prepared by a polymer process that did not include redox polymerization.

A monomer emulsion was prepared by combining 969 g of BA, 34 g of MAA, 680 g of MMA, 460 g DI water, and 18.7 g Triton™ XN-45S surfactant (Triton is a trademark of Union Carbide Co.), and emulsifying with stirring. Next, 2.5 g Triton™ XN-45S surfactant and 1000 g DI water were charged to a five liter multi-neck flask fitted with mechanical stirring. The contents of the flask was heated to 85° C. under a nitrogen atmosphere. To the stirred flask contents were added 92 g the monomer emulsion followed by 2.6 g APS in 100 g DI water and followed by 1.7 g sodium carbonate in 100 g DI water. Next, 34 g of a 50% solution of ureido methacrylate was added to the remainder of the monomer emulsion and the gradual addition of the monomer emulsion was subsequently initiated. The total addition time for the monomer emulsion was 210 minutes. Reactor temperature was maintained at 80° C. to 85° C. throughout the addition of the monomer mixture. Next, 60 g DI water was used to rinse the emulsion feed line to the reactor. The contents of the reactor were cooled to 65° C. Next 6.6 ppm ferrous sulfate, 1 g t-butyl hydroperoxide, and 0.5 g D-isoascorbic acid in aqueous solutions were added to the flask. The contents of the flask was neutralized to a pH in the range of 9–10 with ammonium hydroxide. The percent conversion of the monomer in the reaction mixture during the addition of the monomer emulsion is shown in Table A.1.

TABLE A.1

% Conversion of Monomer in the Polymerization of Comparative A

| weight % of monomer feed | weight % polymer formed | weight % unreacted added monomer |
|---|---|---|
| 14.3 | 95.3 | 4.7 |
| 28.3 | 96.4 | 3.6 |
| 42.3 | 97.2 | 2.8 |
| 57.13 | 97.5 | 2.5 |
| 71.43 | 98.1 | 1.9 |
| 85.73 | 98.2 | 1.8 |

The resulting aqueous dispersion, Comparative A, contained 46.7 weight % of the comparative soft polymer particles, based on the total weight of Comparative A. The comparative soft polymer particles had an average particle diameter of 147 nm and a glass transition temperature of −6° C. Further, the comparative soft polymer particles of Comparative A were not formed either in a process wherein at least 40 weight % of each of the soft polymer particles were polymerization in the presence of excess unreacted monomer, or a process wherein at least 40 weight % of each of the soft polymer particles are formed in a redox polymerization.

EXAMPLE 3

Preparation of an Aqueous Dispersion Containing Hard Polymer Particles

A monomer mixture was prepared by combining 413 g DI water, 16.4 g SLS, 495.6 g BA, 1285.0 g MMA, and 36.7 g MAA. Next, 1482 g DI water and 32.8 g SLS were added to a five liter flask equipped with mechanical stirring. The contents of the flask was heated to 85° C. A solution containing 5.7 g sodium carbonate dissolved in 56 g DI water was added to the flask, followed by 102 g of the monomer emulsion, followed by a solution containing 7.3 g ammonium persulfate dissolved in 51 g DI water. Next, 36.7 g of 50 weight % ureido methacrylate was added to the monomer emulsion. The remainder of monomer emulsion was added to the flask over a period of 90 minutes, while contents of the flask was maintained at a temperature in the range of 83–85° C. The flask contents were held at temperature for 10 minutes and then cooled to 65° C. Next 6.6 ppm ferrous sulfate, 1 g t-butyl hydroperoxide, and 0.5 g D-isoascorbic acid in aqueous solutions were added to the flask. After cooling to 45° C., the contents of the flask was neutralized with the addition of 16.0 g ammonium hydroxide (29% active) and diluted with DI water.

The resulting aqueous dispersion, Example 3, contained 45.9 weight % of the hard polymer particles, based on the total weight of Example 3. The hard polymer particles had an average particle diameter of 102 nm and a glass transition temperature of 43° C. Example 3 had a viscosity of 103 cps.

EXAMPLE 4

Preparation of Aqueous Polymer Blend Composition and Comparative Aqueous Polymer Blend Composition for Scrub Resistance Measurements Titanium dispersions were prepared by mixing the ingredients in Table 4.1 in the order listed. The ingredients were mixed under high shear conditions to disperse the titanium dioxide pigment.

TABLE 4.1

Titanium Dioxide Dispersion

| Ingredient | Weight in grams |
|---|---|
| Tamol ™ 731A dispersant (Rohm and Haas Co.) | 13.99 |
| Tego ™ Foamex 810 defoamer (Th. Goldschmidt AG) | 1.13 |
| Surfynol ™ CT-111 surfactant (Air Products) | 2.25 |
| Ti-Pure ™ R-706 titanium dioxide (E. I. DuPont DeNemours Co.) | 264.44 |
| Water | 62.26 |

The aqueous polymer blend composition, Example 4.1, and the comparative aqueous polymer blend composition, Comparative B, were prepared by combining the ingredients in Table 4.2 in the order listed with low shear mixing.

TABLE 4.2

Aqueous Polymer Blend Composition and Comparative Aqueous Polymer Blend Composition

| Ingredient | Example 4.1 | Comparative B |
|---|---|---|
| titanium dioxide dispersion | 344.07 g | 344.07 g |
| Water | 20.00 g | 20.00 g |
| propylene glycol | 16.50 g | 16.50 g |
| Example 1 (soft) | 430.1 g | — |
| Example 3 (hard) | 115.26 g | 115.26 g |
| Comparative A | — | 420.7 g |
| Surfynol ™ CT-111 surfactant (Air Products and Chemical, Inc.) | 1.00 g | 1.00 g |
| ammonia (28%) | 0.70 g | 0.70 g |
| Acrysol ™ RM-2020 NPR rheology modifier (Rohm and Haas Co.) | 29.00 g | 29.00 g |
| Acrysol ™ RM-8W rheology modifier (Rohm and Haas Co.) | 5.60 g | 5.60 g |
| Water | 104.2 g | 113.62 g |
| VOC (weight %) | 1.5 | 1.5 |

EXAMPLE 5

Preparation of Aqueous Polymer Blend Composition and Comparative Aqueous Polymer Composition for Dirt Pickup Resistance Measurements Titanium dioxide dispersions were prepared according to the procedure of Example 4. Next, the aqueous polymer blend composition, Example 5.1, and the comparative aqueous polymer composition, Comparative C, were prepared by adding the ingredients in Table 5.1 in the order listed with low shear mixing.

TABLE 5.1

Aqueous Polymer Blend Composition and Comparative Aqueous Polymer Composition

| Ingredient | Example 5.1 | Comparative C |
|---|---|---|
| titanium dioxide dispersion | 344.07 g | 344.07 g |
| Water | 20.00 g | 20.00 g |
| propylene glycol | 16.50 g | 16.50 g |
| Example 1 (soft) | 430.1 g | 537.65 g |
| Example 3 (hard) | 115.26 g | — |
| Surfynol ™ CT-111 surfactant | 1.00 g | 1.00 g |
| ammonia (28%) | 0.70 g | 0.70 g |
| Polyphase ™ AF-1 biocide (Troy Corporation) | 8.00 g | 8.00 g |
| Acrysol ™ RM-2020 NPR rheology modifier (Rohm and Haas Co.) | 29.00 g | 29.00 g |
| Acrysol ™ RM-8W rheology modifier (Rohm and Haas Co.) | 5.60 g | 5.60 g |
| water | 104.2 g | 113.62 g |
| VOC (weight %) | <2.25 | <2.25 |

EXAMPLE 6

Evaluation of Scrub Resistance

Dry coating samples are prepared from the aqueous polymer blend composition, Example 4.1, and the comparative aqueous polymer blend composition, Comparative B, and are evaluated according to the procedure for the scrub resistance test. The scrub resistance for the dry coating prepared from the aqueous polymer blend composition of this invention, Example 4.1, is greater than 110% of the scrub resistance of the dry coating prepared from the comparative aqueous polymer blend composition, Comparative B. Thus, the relative scrub resistance value, RS, is greater than 1.1. This result demonstrates improved scrub resistance for the dry coating prepared from the aqueous polymer blend composition containing the hard polymer particles and the select soft polymer particles compared to the dry coating prepared from the comparative polymer blend composition containing the hard polymer particles and the comparative soft polymer particles.

EXAMPLE 7

Evaluation of Dirt Pickup Resistance

Dry coating samples are prepared from the aqueous polymer blend composition, Example 5.1, and the comparative aqueous polymer composition, Comparative C and are evaluated according to the procedure for the dirt pickup resistance test. The dirt pickup resistance for the dry coating prepared from the aqueous polymer blend composition of this invention, Example 5.1, is greater than 110% of the dirt pickup resistance of the dry coating prepared from the comparative aqueous polymer composition, Comparative C. Thus, the relative dirt pickup resistance value, RL, is greater than 1.1. This result demonstrates improved dirt pickup resistance for the dry coating prepared from the aqueous polymer blend composition containing the hard polymer particles and the select soft polymer particles compared to the dry coating prepared from the comparative aqueous polymer composition containing the soft polymer particles, but not containing the hard polymer particles.

EXAMPLE 8

Total Improvement Factor

In Example 6, the relative scrub resistance value of the dry coating, RS, which is prepared from the aqueous polymer blend composition of this invention, is greater than 1.1. In Example 7, the relative dirt pickup resistance value of the dry coating, RL, which is prepared from the aqueous polymer blend composition of this invention, is greater than 1.1. The total improvement factor of the dry coating, which is prepared from the aqueous polymer blend composition containing the select soft polymer particles, is greater than 1.2.

What is claimed is:

1. An aqueous polymer blend composition comprising:
   i) from 2 to 30 weight % of hard polymer particles; and
   ii) from 70 to 98 weight % of soft polymer particles;
   based on the total weight of said hard polymer particles and said soft polymer particles;
   wherein said soft polymer particles have a glass transition temperature ($T_g$) in the range of from −20° C. to 25° C., and said hard polymer particles have a $T_g$ of greater than 25° C. and at least 10° C. greater than said $T_g$ of said soft polymer particles;
   wherein said soft polymer particles comprise as copolymerized units, from 70 to 99.7 weight % monoethylenically unsaturated (meth)acrylic monomer, from 0.3 to 10 weight % monoethylenically unsaturated acid monomer; and from 0 to 29.7 weight % third monomer, based on weight of said soft polymer particles;
   wherein said hard polymer particles have a weight average molecular weight of at least 100,000; and
   wherein:
   a) at least 40 weight % of each of said soft polymer particles, based on weight of said soft polymer particles, is formed by redox polymerization; or
   b) at least 40 weight % of each of said soft polymer particles is polymerized in the presence of at least 5 weight % of added monomer that remains unreacted, based on accumulated weight of said added monomer, said added monomer being selected from said monoethylenically unsaturated (meth)acrylic monomer, said monoethylenically unsaturated acid monomer, said third monomer, and mixtures thereof.

2. The aqueous polymer blend composition according to claim 1 wherein said redox polymerization is effected in the presence of 0.001 to 0.05 moles chain transfer agent per kg weight of said soft polymer particles.

3. The aqueous polymer blend composition according to claim 2 wherein said redox polymerization is effected in the presence of 0.0025 to 0.025 moles chain transfer agent per kg weight of said soft polymer particles.

4. The aqueous polymer blend composition according to claim 1 wherein said redox polymerization is effected at a pH of 4 to 8.

5. The aqueous polymer blend composition according to claim 1 further comprising pigment, wherein said aqueous polymer blend composition has a pigment volume concentration of less than or equal to 40 and has volatile organic compound level of less than 5% by weight based on the total weight of said aqueous polymer blend composition.

6. The aqueous polymer blend composition according to claim 1 further comprising pigment, wherein said aqueous polymer blend composition has a pigment volume concentration greater than or equal to 35 and has volatile organic compound content of less than 3% by weight based on the total weight of said aqueous polymer blend composition.

7. The aqueous polymer blend composition according to claim 1 further comprising pigment, wherein said aqueous polymer blend composition has a pigment volume concentration of less than or equal to 85 and has volatile organic compound content of less than 1.7% by weight based on the total weight of said aqueous polymer blend composition.

8. A method for preparing a dry coating comprising the steps of:
   a) forming an aqueous coating composition comprising:
      i) from 2 to 30 weight % of hard polymer particles; and
      ii) from 70 to 98 weight % of soft polymer particles;
   based on the total weight of said hard polymer particles and said soft polymer particles;
      wherein said soft polymer particles have a glass transition temperature ($T_g$) in the range of from −20° C. to 25° C., and said hard polymer particles have a $T_g$ of greater than 25° C. and at least 10° C. greater than said $T_g$ of said soft polymer particles;
      wherein said soft polymer particles comprise as copolymerized units, from 70 to 99.7 weight % monoethylenically unsaturated (meth)acrylic monomer, from 0.3 to 10 weight % monoethylenically unsaturated acid monomer; and from 0 to 29.7 weight % third monomer, based on weight of said soft polymer particles;
      wherein said hard polymer particles have a weight average molecular weight of at least 100,000; and wherein:
   1) at least 40 weight % of each of said soft polymer particles, based on weight of said soft polymer particles, is formed by redox polymerization; or
   2) at least 40 weight % of each of said soft polymer particles is polymerized in the presence of at least 5 weight % of added monomer that remains unreacted, based on accumulated weight of said added monomer, said added monomer being selected from said monoethylenically unsaturated (meth)acrylic monomer, said monoethylenically unsaturated acid monomer, said third monomer, and mixtures thereof;
   b) applying said coating composition to a substrate; and
   c) drying, or allowing to dry, said applied coating composition to prepare said dried coating.

9. The method according to claim 8 wherein said redox polymerization is effected in the presence of 0.001 to 0.05 moles chain transfer agent per kg weight of said soft polymer particles.

10. The method according to claim 8 wherein said redox polymerization is effected at a pH of 4 to 8.

* * * * *